United States Patent Office 3,317,431
Patented May 2, 1967

3,317,431
WATER TREATING REAGENT AND METHOD
Saul Kaye, Evanston, Ill., assignor to Wright Chemical Corporation, Chicago, Ill., a corporation of Illinois
No Drawing. Filed Oct. 8, 1964, Ser. No. 402,641
7 Claims. (Cl. 252—180)

This invention relates to water treating reagents and methods. More particularly, the present invention concerns the treatment of cooling water with specific types of naturally-occurring and/or chemically-modified wood extracts and tannins for controlling the agglomeration and precipitaiton of certain insoluble heat-coagulable particles. This invention is specifically directed to the treating of industrial process waters which are circulated through equipment such as cooling towers and heat exchangers. Accordingly, as found in the specification and claims, the term "cooling water" is used to denote this type of industrial process water and is to be distinguished from other process waters such as, for example, boiler waters.

In treating cooling waters with chemical additives for the prevention and control of scale in industrial process equipment, conventional techniques have been primarily concerned with the presence in the water of soluble materials which become insolubilized and precipitate out in heat exchange systems. Heretofore, little or no attention has been paid to certain minute insoluble particles, present in some natural waters, which, when heat is applied, can cause equally serious scale problems. In this connection, for full and complete understanding of this application, it is important to note that the method and reagent of the present invention are concerned with this latter type of scale formation, namely, that caused by heat-coagulable insoluble particles.

Not all insoluble particles found in water available for industrial use are heat-coagulable. One source of turbid water characterized by the tendency for heat coagulation, is the Brazos River, in Texas. Similarly, the water of the Cuyahoga River, in Ohio, also contains these heat-coaguable insoluble particles. On the other hand, well water from Mandan, N. Dak., while also being turbid, does not show coagulation on heating.

Scale caused by the agglomeration and precipitation of these heat-coagulable insoluble suspended materials have presented serious problems in heat exchange equipment. In particular, deposits from these waters build up in those heat exchanger locations where the flow is slow or quiescent, such as at the interior corners and the edges of the baffles. These deposit build ups not only reduce heat transfer efficiency, but also adversely affect the fluid flow.

Conventional methods for treating these waters have included the use of settling ponds, filtration, and the addition of coagulants such as alum and copperas. Coagulant aids such as clays and polyelectrolytes for facilitating the settling of such particles in special tanks have also been used. While these methods can be used to eliminate all the water-borne particles, such thorough treatment can be costly, particularly where large quantities of cooling water are required. In this connection, it has been found that the method and reagent of the present invention can be used in conjunction with conventional water treatment techniques to provide suitable cooling water at a fraction of the cost of this water where conventional methods are used alone.

The present invention also finds significant utility in those plants where cooling water of this type is readily available by permitting single-use water treatment. In these situations, it is possible to rely solely on the reagent and method of the present invention without constructing conventional water clarification equipment.

A further significant aspect of the present invention concerns its compatibility with known corrosion inhibitors, such as, for example, the zinc, chromate and phosphate ions. It has been found that these corrosion inhibitors act to sensitive these heat-coagulable particles so as to increase their tendency to agglomerate and precipitate onto the heat transfer surfaces. This is particularly true of the zinc and chromate type corrosion inhibitors. In this connection it is important to note that the reagent and method of this invention act to significantly decrease the amount of corrosion inhibitor needed in a given cooling water system, since the heat transfer surfaces are kept substantially free from scale formation. At the same time, it was noted that with the present invention, it is possible to use higher quantities of these corrosion inhibitors. This is true since the specific wood extracts and tannins of this invention do not have the adverse effect of removing the corrosion inhibitors from solution, and instead act as stabilizers for these chemical reagents.

It is, therefore, an object of the present invention to provide an improved water treating method and reagent which is particularly suitable for cooling water operations wherein the water contains heat-coagulable insoluble materials.

Another object of the present invention is to provide a cooling water reagent composition which substantially reduces the depositing of heat-coagulable materials in industrial heat transfer equipment.

A further object of the present invention is to enable the use, for heat exchange purposes, of cooling water containing suspended heat-coagulable particles without treating this water by conventional clarification equipment.

Another object of the present invention is to permit the use of cooling water containing heat coagulable particles without reducing the heat transfer efficiency of heat exchangers through which this cooling water passes.

A still further object of the present invention is to permit the use of higher water temperatures in heat exchanger systems without incurring increased buildup of scale and sludge deposits from the cooling water.

A yet further and important object of the present invention is to provide a cooling water reagent composition which substantially reduces the amounts of other water treatment chemicals needed, particularly, the corrosion inhibitors.

A still further object of the present invention is to permit the use of higher quantities of water treatment chemicals such as phosphates, chromates, acids and the like, as corrosion inhibitors, where the requirements of a given cooling water system demand such. With regard to this object, it is important to note that the particular wood extracts and tannins of this invention act as stabilizers for these water treatment chemicals.

Other and further objects of the present invention will be apparent to those skilled in the art as the specification proceeds.

An important aspect of the present invention involves the discovery that only certain types of naturally-occurring and chemically-modified wood extracts are capable of delaying and preventing the agglomeration and precipitation of heat-coagulable insoluble suspended particles. These naturally-occurring and chemically-modified wood extracts are generally known as tannins. As such, these organic compounds possess basic chemical similarity and occur in various mixtures, in wood, bark, fruit, galls, and leaves of most plants. However, it was observed that only certain tannins possess this unique ability to keep heat-coagulable insoluble particles in suspension. Heretofore these organic compounds have been indiscriminately used in water treatment, particularly boiler water treatment, as sludge conditioners, acting generally to prevent particles from sticking to boiler surfaces. In fact, the tannins have been believed to be interchangeable with other "organics" for water treatment purposes.

These "organics" include the lignins, lignosulfonates, starches, alginates, adhesives, cellulose derivatives, synthetic and natural gums, and high polymers of all types.

The significance of this discovery became apparent when it was noted that this indiscriminate use of these "organics" and particularly the tannin compounds would not give satisfactory results in the treatment of cooling water containing these heat-coagulable particles. Thus, for what is believed to be the first time, it was noted that the tannins were not interchangeable with respect to their usefulness as deposit preventatives.

In searching for an explanation to this discovery, it was found that there are two main classes of tannins. Tannins which fall within the first of these classes are called "condensed," "catechol-type" or "phlobaphene" tannins. These terms have been interchangeably used and are hereinafter referred to in the specification and claims as "condensed" tannins. The second class of tannins have been termed as "hydrolyzable" or "pyrogallol-type" tannins, hereinafter referred to as "hydrolyzable" tannins. For a further explanation of these two chemical classes see Kirk and Othmer, Encyclopedia of Chemical Technology, Interscience Encyclopedia Inc., New York, 1954, vol. 13, pages 587–592. In accordance with the present invention it was noted that the "condensed" tannins possess uniquely powerful anticoagulating activity for certain types of heat-coagulable materials while the "hydrolyzable" tannins possess very slight, if any, anticoagulating activity. For example, tannic acid and chestnut extract (hydrolyzable tannins) were observed to have very little, if any, anticoagulant characteristics while sulfonated redwood bark extract, redwood bark extract, wattle extract, quebracho extract and eucalyptus extracts (all of which are condensed tannins) proved to be excellent water treating reagents for preventing agglomeration and precipitation in cooling waters containing heat-coagulable materials such as that found in the Brazos and Cuyahoga Rivers.

In using the term "condensed" tannins applicant wishes to point out that of those extracts tested, the ones which appeared to offer the best anticoagulant activity fell within this particular chemical classification of Kirk and Othmer. It is important to realize, however, that other organic compounds most likely possess similar characteristics with regard to heat-coagulable water-borne particles. Accordingly, as used in this application, the term "condensed" tannins is intended to cover those organic compounds exhibiting anticoagulant activity comparable to redwood extract, quebracho extract, wattle extract, and eucalyptus extract. In this connection, as will more fully appear below, it is noted that some of the so-called "hydrolyzable" tannins do show limited anticoagulant activity.

One source of a commercially advantageous supply of "condensed" tannins is spent or exhausted tanning liquor. These by-products of leather tanneries, when tested, gave excellent anticoagulant results. While the tannin concentrations in these spent tanning liquors may vary, an analysis of one sample showed that it contained approximately 11% solids of which the quebracho and wattle extracts predominated, although there were some chestnut extracts present also.

In accordance with the present invention, comparative tests were made on various tannins and other organic compounds such as the polysaccharides and their derivatives, lignin derivatives, amines, proteins, soluble cellulose derivatives, chelating agents such as sodium gluconate and sodium hexametaphosphate, and certain synthetic organic polymers such as polyvinyl pyrrolidone and the polyacrylamides ("Zimite," W. E. Zimmie, Inc.). The results of the tests verify that the "condensed" tannins exhibit the best anticoagulant activity and that certain of the polysaccharides and lignin derivatives show limited anticoagulant activity. In particular, it was noted that some of these reagents such as polyvinyl pyrrolidone and the polyacrylamides actually acted to speed up coagulation of the heat-coagulable particles.

In one test, to determine the anticoagulant activity of certain of these compounds with regard to temperature variations a 150 ml. glass container was fitted with an immersion heater and thermometer. The glass container was then filled with Chicago tap water which contained a suspension of bentonite clay of approximately 100 p.p.m. The suspension of bentonite in tap water was then heated at a constant rate and observed to note when coagulation began. The reagents were present in concentrations of 10 p.p.m. As is shown in the table below, the sulfonated redwood bark extract, sodium salt and the redwood bark extracts gave the best results, permitting an extra 15° to 23° C. before coagulation occurred. This increase temperature tolerance is significant in that it permits the use of higher water temperatures in heat exchange equipment.

TABLE 1.—COAGULATION TEMPERATURE RANGES OF BENTONITE SUSPENSIONS CONTAINING 10 P.P.M. OF VARIOUS ANTICOAGULANTS

Reagent: Coag. T., ° C.
Tannins—
  Sulfonated redwood bark extract, sodium salt _____ 98–99
  Redwood bark extract, sodium salt _____ 92–94
Lignosulfonates _____ 82–85
Polysaccharides _____ 77–83
Untreated suspensions _____ 75–78

In another test, temperature was kept as a constant to determine the effects of various tannins on a time basis. The samples of naturally silty water were taken from the Brazos River. These samples were held at 70° C. and the time required for their coagulation was noted as is shown below.

TABLE 2.—TIME REQUIRED FOR COAGULATION OF SOLIDS IN A NATURAL SILTY WATER TREATED WITH VARIOUS TANNINS, HELD AT 70° C.

| Treatment | Conc., p.p.m. | Minutes, 70° C. |
|---|---|---|
| Water sample | | 40 |
| Water sample+Sulfonated redwood bark extract | 10 | 160 |
| Water sample+Redwood bark extract | 10 | 145 |
| Water sample+Chestnut extract | 10 | 80 |
| Water sample+Eucalyptus extract | 10 | over 175 |
| Water sample+Wattle extract | 10 | over 175 |
| Water sample+Quebracho extract | 10 | over 175 |

As the results indicate, each of the extracts extended the time required for coagulation, with eucalyptus, wattle and quebracho extracts giving the best results. Limited anticoagulant activity was obtained with chestnut extract.

The effectiveness and compatibility of the "condensed" tannins and other organic materials with known corrosion inhibitors was also tested. These factors are particularly important since corrosion inhibitors will normally be present in the water being treated with the "condensed" tannins. In fact, in some cases, it may be desirable to prepare reagents which include the "condensed" tannins of the present invention, as well as the corrosion inhibitors. These corrosion inhibitors are well known in the art and include such materials as the chromates, phosphates, amines and sulphates. For example, in one test 50 p.p.m. of a commercial corrosion-inhibiting mixture (Mixture W, Wright Chemical Corporation) were added to the Brazos River water. This concentration of the mixture provided 31 p.p.m. of sodium dichromate, 9.4 p.p.m. of zinc sulfate, and 4.7 p.p.m. of sodium hexametaphosphate in water. Various concentrations of the tannins were then added with the samples being maintained at 70° C. The results of this test are tabulated below:

TABLE 3.—TIME REQUIRED AT 70° C. FOR COAGULATION OF SOLIDS IN A NATURAL SILTY WATER TREATED WITH 50 P.P.M. CORROSION INHIBITOR, AND VARIOUS TANNINS

| Treatment | Tannin Concentration, p.p.m. | Time, min. |
|---|---|---|
| Water only | 0 | 40 |
| Water + 50 p.p.m. Mixture W | 0 | 30 |
| Water + 50 p.p.m. Mixture W + Redwood extract | 6.7 | 185 |
| Do | 3.3 | 85 |
| Water + 50 p.p.m. Mixture W + Quebracho extract | 6.7 | over 290 |
| Do | 3.3 | 290 |
| Water + 50 p.p.m. Mixture W + Wattle extract | 6.7 | 245 |
| Do | 3.3 | 215 |
| Water + 50 p.p.m. Mixture W + Eucalyptus extract | 6.7 | 100 |
| Do | 3.3 | 75 |
| Water + 50 p.p.m. Mixture W + Chestnut extract | 6.7 | 35 |
| Do | 3.3 | 35 |
| Water + 50 p.p.m. Mixture W + Daxad 23 [1] | 17 | 35 |
| Do.[1] | 10 | 30 |
| Wster + 50 p.p.m. Mixture W + Orzan S [2] | 17 | 35 |
| Do.[2] | 10 | 30 |

[1] Lignin derivative, Dewey & Almy Div., Grace Corp.
[2] Lignin derivative, Crown Zellerbach Co.

As is noted, certain lignin derivatives, included for comparison purposes, were found to increase the tendency of the particles to coagulate. Of the tannins tested, redwood extract, quebracho extract, wattle extract and eucalyptus extract offered the best results. As was mentioned above, each of these extracts are within the "condensed" tannin chemical group.

In order to more fully understand the operation of these ingredients, a second experiment along the lines of that given in Table 3 was performed. In this experiment, however, the sequence was varied with the tannins and lignin derivatives being added to the silty water first, followed by the same concentration of corrosion-inhibiting mixture as was used in the previous test. The results were identical to those obtained above; i.e. the order of addition of these materials did not affect anticoagulant activity.

The effect of higher operating temperatures on the corrosion inhibiting-condensed tannin reagent mixtures was noted by repeating portions of the above test at the elevated temperature of 90° C. The results of this test are tabulated below.

TABLE 4.—TIME REQUIRED AT 90° C. FOR COAGULATION OF A NATURAL SILTY WATER TREATED WITH 50 P.P.M. CORROSION INHIBITOR, AND TANNINS AND LIGNIN DERIVATIVES

| Treatment | Concentration Anticoagulant, p.p.m. | Time, min. |
|---|---|---|
| Water only | 0 | 15 |
| Water + Redwood extract | 10 | over 75 |
| Water + Daxad 23 | 10 | 35 |
| Water + 50 p.p.m. Mixture W | 0 | 10 |
| Water + 50 p.p.m. Mixture W + Redwood extract | 10 | over 75 |
| Do | 6.7 | 75 |
| Do | 3.3 | 45 |
| Water + 59 p.p.m. Mixture W + Daxad 23 | 10 | 10 |

As is shown by Tables 3 and 4, the "condensed" tannins operate equally well as anticoagulants when corrosion inhibitors are present as when they are not. This further illustrates the unobviousness of their use in this type of water treatment, since, as was pointed out above, all tannins were believed to be interchangeable for water treatment purposes. In this regard it should further be noted that lignin derivatives while having some effect as anticoagulants in the absence of a corrosion inhibitor, acted conversely when the corrosion inhibitor was present by actually speeding up the coagulation of the suspended particles. On observation, it was found that considerable adsorption of chromate took place on silt particles when lignin derivatives were used. Agglomeration and precipitation of suspended insoluble heat coagulable materials therefore, not only had the disadvantageous effect of forming deposits, but also acted to remove the chromate from solution, thereby rendering it unable to perform its anticorrosion function. From these tests and observations, it was found that the "condensed" tannins of the present invention serve additionally as stabilizing agents for the soluble chromate and other anticorrosive chemicals, as well as acting as anticoagulants.

Further experimentation to determine the anticoagulant properties of a number of "condensed" and "hydrolyzable" tannins was performed. In these tests, water samples were prepared from Chicago tap water and bentonite clay. There suspensions were treated with 50 p.p.m. of Mixture W and 10 p.p.m. concentrations of various tanning agents. Sample temperature was maintained at 70° C. The results of the tests are tabulated below.

TABLE 5.—TIME REQUIRED AT 70° C. FOR COAGULATION OF BENTONITE SUSPENDED IN CHICAGO TAP WATER CONTAINING 50 P.P.M. CORROSION INHIBITOR, AND VARIOUS TANNINS

[Employed at 10 p.p.m. solids concentration]

| Tanning Agent or Extract | Classification | Time, 70° C. (min.) |
|---|---|---|
| 1. None | | 10 |
| 2. Sulfonated redwood bark extract | Condensed | 70 |
| 3. Redwood bark extract | do | 60 |
| 4. Wattle extract | do | 200 |
| 5. Quebracho extract | do | 70 |
| 6. Eucalyptus extract | do | 35 |
| 7. Dried exhausted tanning liquor | do | 70 |
| 8. Exhausted tanning liquor | do | 70 |
| 9. Tannic acid sodium salt | Hydrolyzable | 5 |
| 10. Domestic chestnut extract | do | 15 |
| 11. French chestnut extract | do | 20 |
| 12. Italian chestnut extract | do | 20 |
| 13. Myrobalans extract | do | 15 |
| 14. Tamol SD (Rohm and Haas) | Synthetic | 5 |
| 15. Glutaraldehyde (Union Carbide) | do | 10 |

From this data, it was noted that the synthetic tanning agents (Tamol SD and glutaraldehyde) did not show any anticoagulant activity. On the other hand, exhausted vegetable tanning-liquors (items 7 and 8) were found to have retained good anticoagulant activity.

Ranges of tannin concentration and pH were also determined by experimentation. In this connection, it was observed that the "condensed" tannins were effective as anticoagulants within the pH range required for normal cooling water operations, namely, between 5.5 and 9. Similarly, a useful concentration range for the "condensed" tannins was found to be between 0.5 and 55 p.p.m., with the preferred range being between 5 and 10 p.p.m. This, of course, is dependent on the extent and amount of heat coagulable insolubles present, and also upon the specific nature of the heat exchanger system, fluid flow rate, temperatures reached, and the like.

While in the foregoing specification, for purposes of illustrating specific embodiments of this invention, I have set forth many details as to specific "condensed" tannins, it will be apparent to those skilled in the art that many of the details thereof can be varied without departing from the spirit and scope of the present invention.

I claim:

1. The method of treating cooling water to control the formation of scale caused by the agglomeration and precipitation of heat-coagulable insoluble suspended particles which method comprises introducing at least 0.5 part per million, by weight, of a "condensed" tannin into said cooling water.

2. The method of claim 1 wherein said "condensed" tannin is selected from the group consisting of redwood extract, quebracho extract, wattle extract and eucalyptus extract.

3. The method of claim 1 wherein the pH of said cooling water ranges from approximately 5.5 to 9.

4. The method of claim 1 wherein from 0.5 to 55 parts per million, by weight, of "condensed" tannin are introduced into said cooling water.

5. The method of claim 1 wherein from 5 to 15 parts per million, by weight, of "condensed" tannin are introduced into said cooling water.

6. The method of treating cooling water having a pH of from approximately 5.5 to 9 to control the formation of scale caused by the agglomeration and precipitation of heat-coagulable insoluble suspended particles which method comprises providing said cooling water with a "condensed" tannin concentration of from 0.5 to 55 parts per million, by weight.

7. The method of claim 6 wherein said "condensed" tannin is selected from the group consisting of redwood extract, quebracho extract, wattle extract and eucalyptus extract.

References Cited by the Examiner

UNITED STATES PATENTS

| | | | |
|---|---|---|---|
| 2,363,922 | 11/1944 | Denman | 252—180 |
| 2,363,923 | 11/1944 | Denman | 252—180 |
| 2,411,074 | 11/1946 | Winkelmann et al. | 252—180 |
| 2,439,797 | 4/1948 | Denman | 252—180 X |
| 3,116,105 | 12/1963 | Kerst | 252—180 X |
| 3,173,864 | 3/1965 | Freedman | 252—180 X |
| 3,184,407 | 5/1965 | Kahler et al. | 252—181 X |
| 3,256,203 | 6/1966 | Robertson et al. | 252—175 X |

FOREIGN PATENTS 450,547  7/1936  Great Britain.

LEON D. ROSDOL, *Primary Examiner.*

ALBERT T. MEYERS, *Examiner.*

J. T. FEDIGAN, *Assistant Examiner.*